(12) United States Patent
Huang et al.

(10) Patent No.: US 8,166,225 B2
(45) Date of Patent: Apr. 24, 2012

(54) USB INTERFACE DATA TRANSMISSION DEVICE AND USB INTERFACE DATA COMMUNICATION SYSTEM

(75) Inventors: Cheng-Hung Huang, Taipei County (TW); Ming-Feng Chiu, Taipei County (TW); Jou-Fu Chou, Taipei County (TW)

(73) Assignee: Tenx Technology Inc., Banciao, Taipei County (TW)

( * ) Notice: Subject to any disclaimer, the term of this patent is extended or adjusted under 35 U.S.C. 154(b) by 563 days.

(21) Appl. No.: 12/385,475

(22) Filed: Apr. 9, 2009

(65) Prior Publication Data

US 2010/0262745 A1    Oct. 14, 2010

(51) Int. Cl.
*G06F 13/14* (2006.01)

(52) U.S. Cl. ............ 710/305; 710/52; 710/56; 710/310; 370/296; 370/299; 370/419; 370/464; 370/468

(58) Field of Classification Search ............ 710/52, 710/53, 56, 305, 310, 63, 105, 107; 370/296, 370/299, 389, 419, 464, 468, 477

See application file for complete search history.

(56) References Cited

U.S. PATENT DOCUMENTS

| | | | | |
|---|---|---|---|---|
| 4,471,243 A * | 9/1984 | Isham | ............... | 326/86 |
| 6,173,355 B1 * | 1/2001 | Falik et al. | ............. | 710/310 |
| 6,816,929 B2 * | 11/2004 | Ueda | ............. | 710/56 |
| 6,839,777 B1 * | 1/2005 | Vrancic et al. | ............. | 710/52 |
| 6,985,977 B2 * | 1/2006 | Vrancic | ............. | 710/59 |
| 7,069,373 B2 * | 6/2006 | Teng | ............. | 710/310 |
| 7,158,536 B2 * | 1/2007 | Ching et al. | ............. | 370/468 |
| 7,185,132 B2 * | 2/2007 | Tang | ............. | 710/305 |
| 7,293,127 B2 * | 11/2007 | Caruk | ............. | 710/305 |
| 7,359,996 B2 * | 4/2008 | Saito et al. | ............. | 710/25 |
| 7,420,990 B2 * | 9/2008 | Ching et al. | ............. | 370/468 |
| 8,073,009 B2 * | 12/2011 | Ching et al. | ............. | 370/468 |
| 2004/0015634 A1 * | 1/2004 | Alexander et al. | ............. | 710/305 |
| 2004/0218598 A1 * | 11/2004 | Kobayashi | ............. | 370/389 |
| 2005/0240689 A1 * | 10/2005 | Leaming | ............. | 710/52 |
| 2009/0327536 A1 * | 12/2009 | Solomon et al. | ............. | 710/63 |
| 2011/0093633 A1 * | 4/2011 | Solomon et al. | ............. | 710/105 |
| 2011/0106989 A1 * | 5/2011 | Solomon et al. | ............. | 710/63 |

OTHER PUBLICATIONS

Compaq et al. Universal Serial Bus Specification. Revision 2.0. Apr. 27, 2000.*
Hewlett Packard et al. Universal Serial Bus 3.0 Specification. Revision 1.0. Jun. 6, 2011.*
Intel Corporation. Univeral Host Controller Interface (UHCI) Design Guide. Revision 1.1. Mar. 1996.*

* cited by examiner

*Primary Examiner* — Matthew Spittle
(74) *Attorney, Agent, or Firm* — Bacon & Thomas, PLLC

(57) ABSTRACT

The USB interface data transmission device comprises a USB interface controller unit, a dynamic data transmission unit, a central controller unit, a transmission mode configuration unit, a driver program memory and a data transmission interface. In them: The dynamic data transmission unit includes a data input node and a data output node, wherein the data input node supports the data downloading and the data output node support the data uploading, while when necessary the data input node and the data output node support each other's functions by changing their respective data uploading and downloading functions. In a download mode both the data input node and the data output node support the data downloading operation and in an upload mode both support the data uploading operation.

16 Claims, 3 Drawing Sheets

USB INTERFACE DATA TRANSMISSION DEVICE AND USB INTERFACE DATA COMMUNICATION SYSTEM

FIELD OF THE INVENTION

The present invention relates to a device for transmitting data through the USB interface and a system using such device, especially to a data transmission device that dynamically transmits data through the USB interface and a system using the transmission device.

BACKGROUND OF THE INVENTION

In the technology in transmitting data through the USB (Universal Serial Bus), the transmission device is classified into three modes, according to the transmission speed: The low speed mode, the full speed mode and the high speed mode. In transmitting data through the USB interface in each of the above-mentioned modes, the USB specifications and standards shall be completely followed. The USB standards leave little space for designers to develop devices that use the USB interface, in the data transmission mechanism.

In addition, in the conventional USB data transmission devices use independent upload nodes and download nodes to provide the bidirectional data transmission functions. Various designs and transmission methods may be used in realizing the data transmission. Therefore, it is difficult to provide a new mechanism that provides higher data transmission speed and is usable commonly in all or most of the available transmission methods.

Several solutions have been proposed in enhancing the data transmission speed in the USB interface. One proposal is called the "Double-Buffered Transfers" that expands the data buffering space in the data buffers at the upload/download nodes, whereby the data are transmitted in a "ping-pong" manner. This solution reduces the waiting time needed in moving the data to be transmitted, whereby the transmission speed is made higher. However, while the data buffer space at the upload nodes and the download nodes is expanded, the cost of the device is made higher as well.

Therefore, it is necessary to provide a new mechanism for the USB interface data transmission device that provides higher data transmission speed, without suffering from the higher manufacture costs.

OBJECTIVES OF THE INVENTION

The objective of the present invention is to provide a device for transmitting data through the USB interface in higher speed.

Another objective of the present invention is to provide device for transmitting data through the USB interface at low costs.

Another objective of the present invention is to provide a system that transmits data through the USB interface in higher speed.

Another objective of the present invention is to provide a system that transmits data through the USB interface at low costs.

SUMMARY OF THE INVENTION

The present invention provides a USB interface data transmission device that transmit data through the USB interface at higher speeds and lower costs and supports a variety of data transmission modes and types. The present invention also discloses a data transmission system wherein a computer in connection with a USB interface data transmission device through the USB interface executes an application program operated by a user and selects the data transmission mode in connection with the USB interface according to the functionality of the USB data transmission device, as configured by the user.

The USB interface data transmission device of the present invention interfaces a computer and a peripheral device and exchanges data between them. The USB interface data transmission device comprises a USB interface controller unit, a dynamic data transmission unit, a central controller unit, a transmission mode configuration unit, a driver program memory and a data transmission interface. In them: The USB interface controller unit communicates with the computer. The dynamic data transmission unit includes a data input node and a data output node, wherein the data input node supports the data downloading and the data output node support the data uploading, while when necessary the data input node and the data output node support each other's functions by changing their respective data uploading and downloading functions. The central controller unit controls the data transmission mode of the dynamic data transmission unit and the peripheral interfacing functions of the USB interface controller unit.

When the transmission configuration unit obtains information representing the selected data transmission mode of the dynamic data transmission unit from the central controller unit, the transmission configure unit announces representing the selected data transmission mode of the dynamic data transmission unit to the computer. In addition, the data transmission interface receives the data transmitted from the dynamic data transmission unit or the central controller unit and transmits the data to the peripheral device. The data transmission interface also functions to receive the data transmitted from the peripheral device and transmit the data to the dynamic data transmission unit or the central controller unit.

The data input node and the data output node are not limited to any type. The data input node is preferably a dynamic data input node and the data output node is preferably a dynamic data output node. Under a normal transmission mode, the data input node is used in downloading data and the data output node is used in uploading data. When the central controller unit needs to download a large quantity of data, the central controller unit will configure both the data input node and the data output node into the data input mode, wherein the data transmission mode is in the download mode. When the central controller unit needs to upload a large quantity of data, the central controller unit will configure both the data input node and the data output node into the data output mode, wherein the data transmission mode is in the upload mode.

By using the central controller unit in controlling the dynamic data transmission unit, the USB interface data transmission device of the present invention is able to support the data transmission under all types of the data transmission mechanism. As a result, the USB interface data transmission device of this invention is applicable in all types of data transmission mode used with the USB interface, including the Interrupt transfer, the Isochronous transfer and the Bulk transfer. Correspondingly, the data input node is preferably a bulk transfer node or an interrupt transfer node. Similarly, the data output node is preferably a bulk transfer node, an interrupt transfer node or an isochronous transfer node.

The USB interface data transmission system of the present invention comprises: a computer, a peripheral device and a USB interface data transmission device, wherein data are exchanged between the computer and the peripheral device and the USB interface data transmission device dynamically controls the mode of the data transmission between the computer and the peripheral device.

In more details, the USB interface data transmission device of the USB interface data transmission system comprises a USB interface controller unit, a dynamic data transmission unit, a central controller unit, a transmission mode configuration unit, a driver program memory and a data transmission interface. The USB interface controller unit communicates with the computer through a USB communication interface. The dynamic data transmission unit includes a data input node and a data output node. In a normal mode the data input node supports the data downloading and the data output node support the data uploading. In a download mode, both the data input node and the data output node support the data input function. In a upload mode, both the data input node and the data output node support the data output function.

The USB interface data transmission system of the present invention is not limited to any type. Preferably, the USB interface data transmission system of the present invention further include an external memory to exchange data with the computer and the USB interface The USB interface transmission device dynamically controls the mode of the data exchange between the computer and the peripheral.

The driver program memory stores the application programs to be used by the controller unit. The central controller unit of the present invention is not limited to any type. The central controller unit is preferably a microcontroller or a microprocessor. The data transmission interface of the present invention is not limited to any type. It is preferably a bidirectional data transmission interface. The bidirectional data transmission interface is not limited to any particular type and is preferably an SPI interface, a Smart Card Reader interface, a UART interface, a GPIO interface or their combinations. Nevertheless, the driver program memory used in the present invention is not limited to any type and is preferably an OTP ROM, a mask ROM or an external NOR flash memory.

In the USB interface data transmission system of the present invention, the computer is not limited to any type. The computer is preferably equipped with a USB communication interface, whereby the USB interface controller unit communicates with the computer through the USB communication interface. The peripheral device is not limited to any type and is preferably a plug-and-play portable peripheral device.

One major feature of the invented USB interface data transmission device and the USB interface data transmission system is in that the central controller unit controls the data transmission mode of the data transmission unit so that the USB interface data transmission device and the USB interface data transmission system dynamically support the data transmission through the USB interface in a variety of data transmission mode. In the present invention, the data input node and the data output node support each other's functions by dynamically changing their respective data uploading and downloading functions.

To be more specific, in the present invention the central controller unit controls the data transmission mode of the dynamic data transmission unit, so to utilize the idle memory space of the upload buffer memory when downloading a large quantity of data and to utilize the idle memory space of the download buffer memory when uploading a large quantity of data. Because the, the data buffering space that supports the data transmission from either direction is expanded to twice as it is originally designed, whereby the data transmission speed is enhanced.

As such, the invented USB interface data transmission device and the USB interface data transmission system are able to provide a faster and cheaper data transmission solution that supports a plurality of data transmission modes.

These the other objectives and advantages of the present invention may be clearly understood by those skilled in the art from the detailed descriptions by referring to the drawings.

DETAILED DESCRIPTION OF THE INVENTION

In the USB interface data transmission device of the present invention the uploading and downloading of the data transmission through the USB interface are dynamically controlled. When downloading bulk data the idle data buffer space for upload is additionally utilized. On the other hand, when uploading bulk data the idle data buffer space for download is additionally utilized. Thereby, the data input node and the data output node support are able to each other's functions and the data buffering capability in the data transmission from either direction is expanded to twice as designed and the data transmission is thus accelerated. In the addition, the data to be processed by the present invention are not limited to any type and are preferably pure digital data, control data or communication data.

Figure 1:
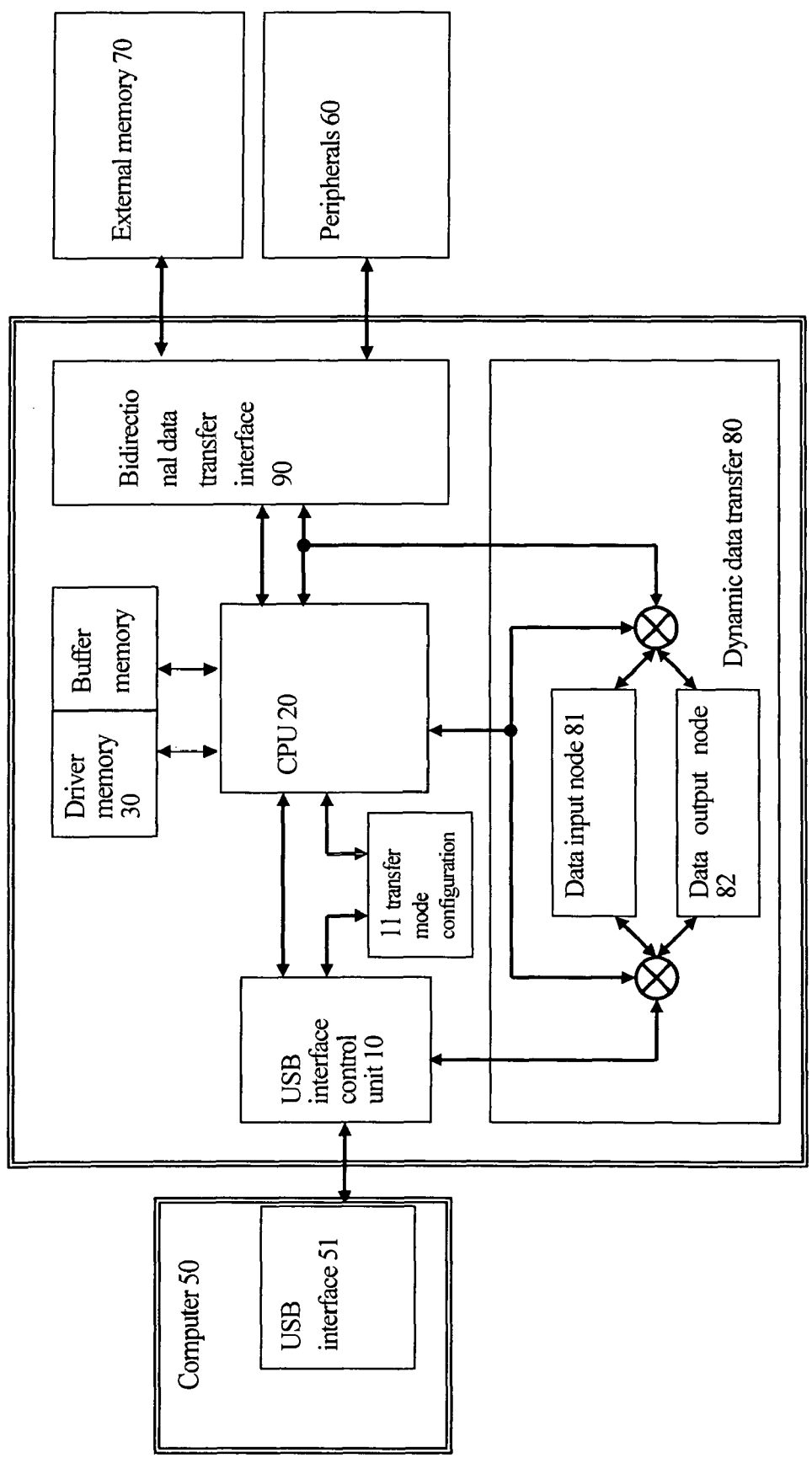
FIG. 1 illustrates the block diagram of the USB interface data transmission system of the present invention.

FIG. 1 illustrates the block diagram of the USB interface data transmission system of the present invention. As shown in this figure, the invented USB interface data transmission device 1 supports the data communication between and data input/output of a computer 50 and a peripheral device 60 or an external memory device 70. The USB interface data transmission device 1 includes a USB interface controller unit 10, a data transmission mode configuration unit 11, a central controller unit 20, a driver program memory 30, a dynamic data transmission unit 80 and a bidirectional data transmission interface 90.

In the present invention, the USB interface controller unit 10 is responsible for the various data communications with the computer 50 and the data input/output controls in the data communications. In the present embodiment, the USB interface controller unit 10 communicates with the computer 50 through the USB communication interface 51.

In addition to that, the central controller unit 20 controls the peripheral interfacing functions of the USB interface controller unit 10, processes the data communication and transfers information. The driver program memory 30 stores application programs to be used by the central controller unit 20.

The dynamic data transmission unit 80 includes a data input node 81 and a data output node 82. The data input node 81 and the data output node 82 may be used as bulk data transfer nodes, interrupt transfer nodes and isochronous transfer nodes.

The central controller unit 20 controls the data transmission mode of the dynamic data transmission unit 80. The information transmitted by the central controller unit 20 comes from data transmission unit 80. The central controller unit 20 is in connection with the USB interface control unit 10, which is in connection with the dynamic data transmission unit 80 and the data transmission mode configuration unit 11.

In other words, the central controller unit 20 controls the data transmission mode of the dynamic data transmission unit 80. When the transmission mode configuration unit 11 receives from the central controller unit 10 information representing the data transmission mode of the dynamic data transmission unit 80, the transmission mode configuration unit 11 announces the data transmission mode of the dynamic data transmission unit 80 to the computer 50.

The central controller unit 20 may be a microcontroller or a microprocessor. In the present embodiment, the functions of the central controller unit 20 include: To process the data from the USB interface controller unit 10, to execute all necessary operations and to output data to the bidirectional data transmission interface 90.

The dynamic data transmission unit 80 includes a data input node 81 and a data output node 82. The central controller unit 20 determines, according to the flow rate of data transmission between the USB interface controller unit 10 and the dynamic data transmission unit 80, the data transmission mode of the dynamic data transmission unit 80 to be one of the normal mode, the upload mode and the download mode. The central controller unit 20 configures both the data input node 81 and the data output node 82 into the upload mode simultaneously, when the data transmission is determined to be the upload mode, or into the download mode simultaneously, when the data transmission is determined to be the download mode.

When the peripheral device 60 or the external memory 70 downloads bulk data from the computer 50 through the USB communication interface 51, the central controller unit 20 selects the bulk data download mode. Thereby the central controller unit 20 configures the data transfer path of the dynamic data transmission unit 80 by setting both the data input node 81 and the data output node 82 into the input mode simultaneously. At the same time, the central controller unit interchanges the data download paths between the data input node 81 and the data output node 82, whereby the buffering memory space for the data being transferred is expanded to as twice as that of the normal mode. The time needed in downloading the data is thus shortened. As such, the waiting time of the USB interface controller unit 10 and the USB communication interface 51 is saved.

On the other hand, when the peripheral device 60 or the external memory 70 uploads bulk data from the computer 50 through the USB communication interface 51, the central controller unit 20 configures the data transmission paths of the dynamic data transmission unit 80 to the bulk data download mode. With this selection the central controller unit 20 sets both the data input node 81 and the data output node 82 into the output mode simultaneously. At the same time, the central controller unit interchanges the data upload paths between the data input node 81 and the data output node 82, whereby the buffering memory space for the data being transferred is expanded to as twice as that of the normal mode. The time needed in uploading the data is thus shortened. As such, the waiting time of the USB interface controller unit 10 and the USB communication interface 51 is also saved.

Figure 2:
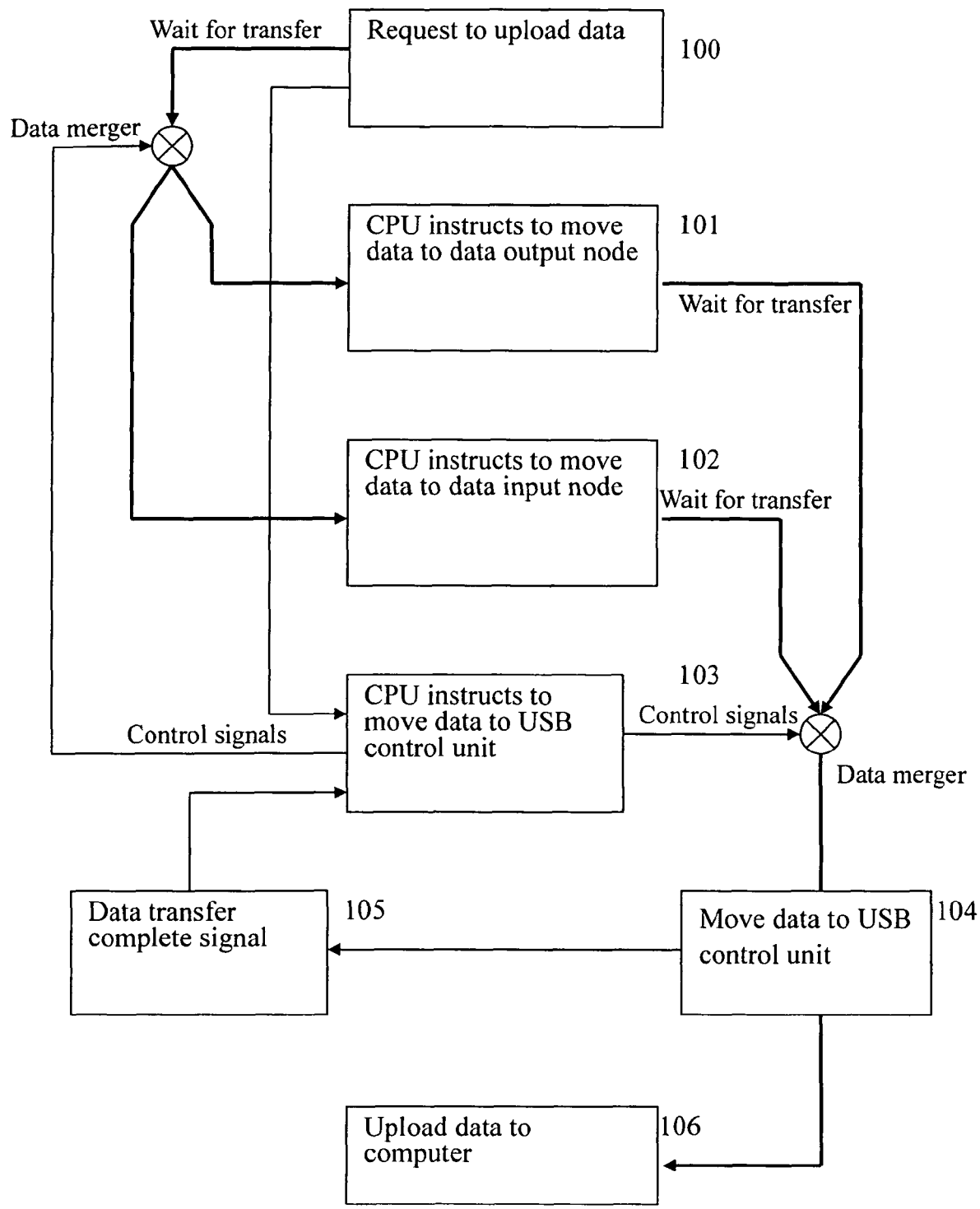
FIG. 2 is the flow chart of the data upload mode of the USB interface data transmission device of the present invention.

FIG. 2 is the flow chart of the data upload mode of the USB interface data transmission device of the present invention. FIG. 2 shows the how data are efficiently transferred by controlling the operations of the data merger nodes in this invention. In the following description of the operation flows of the present invention, its applications in particular products will be give as examples.

When the user connects a USB interface data transmission device 1 and the associated peripheral device 60 directly to a computer 50, to communicate with the computer 50 and to control the data input/output of the USB interface data transmission device 1, USB interface data transmission device 1 sends to the computer 50 the initial announcements. The purpose of the initial announcements is to establish a communication channel by notifying the computer 50 the type of data transfer node of the USB interface data transmission device 1. Based on such announcements, the USB interface data transmission device 1 and the computer 50 complete their negotiation in the communication protocol.

At 100 the external memory 70 or the peripheral device 60 requests to upload bulk data to the computer 50. At 101 the central controller unit 20 instructs to move the first batch of data in the external memory 70 (or the peripheral device 60) to data output node 82. The default settings of the data output node 82 define the data output node 82 as a data transfer device to support the data output. When the data are so transferred, the central controller unit 20 must wait until the data output node 82 completes its data upload. However, in the present invention, in order to save the waiting time, the central controller unit 20 determines that the upload mode shall be used in such circumstance. Therefore, the central controller unit 20 activates the data input node 81 and configures its data transfer mode into the data output mode. At 102 the central controller unit 20 instructs to move the second batch of data in the external memory 70 (or the peripheral device 60) to the data input 81. At 103 the central controller unit 20 instructs to move the data in the data input node 82 to the computer 50 through the USB communication interface 51, after it confirms through the USB interface controller unit 10 that the USB communication interface is ready for the data upload. Thereby, at 104 the data in the dynamic data transmission unit 80 are moved to the USB interface controller unit 10 and are uploaded to the computer 50 at 106. After the data in the dynamic data transmission unit 80 are moved to the USB interface controller unit 10 at 104, at 105 the USB interface controller unit 10 generates a "data transfer complete" signal to the central controller unit 20. Upon the receipt of the "data transfer complete" signal by the central controller unit 20, the process returns to step 101, wherein the central controller unit 20 generates a control signal to the dynamic data output node 82, to move the third batch data from the external memory 70 (or the peripheral device 60) to the data output node 82. At 103 the central controller unit 20 further instructs to move the second batch data in the data input node 81 to the computer 50 through the USB interface controller unit 10. With this instruction, at 104 the data in the dynamic data transmission unit 80 are moved to the USB interface controller unit 10 and are uploaded to the computer 50 at 106. The above steps repeat until all the data in the external device 70 or the peripheral device 60 are all uploaded.

Figure 3:
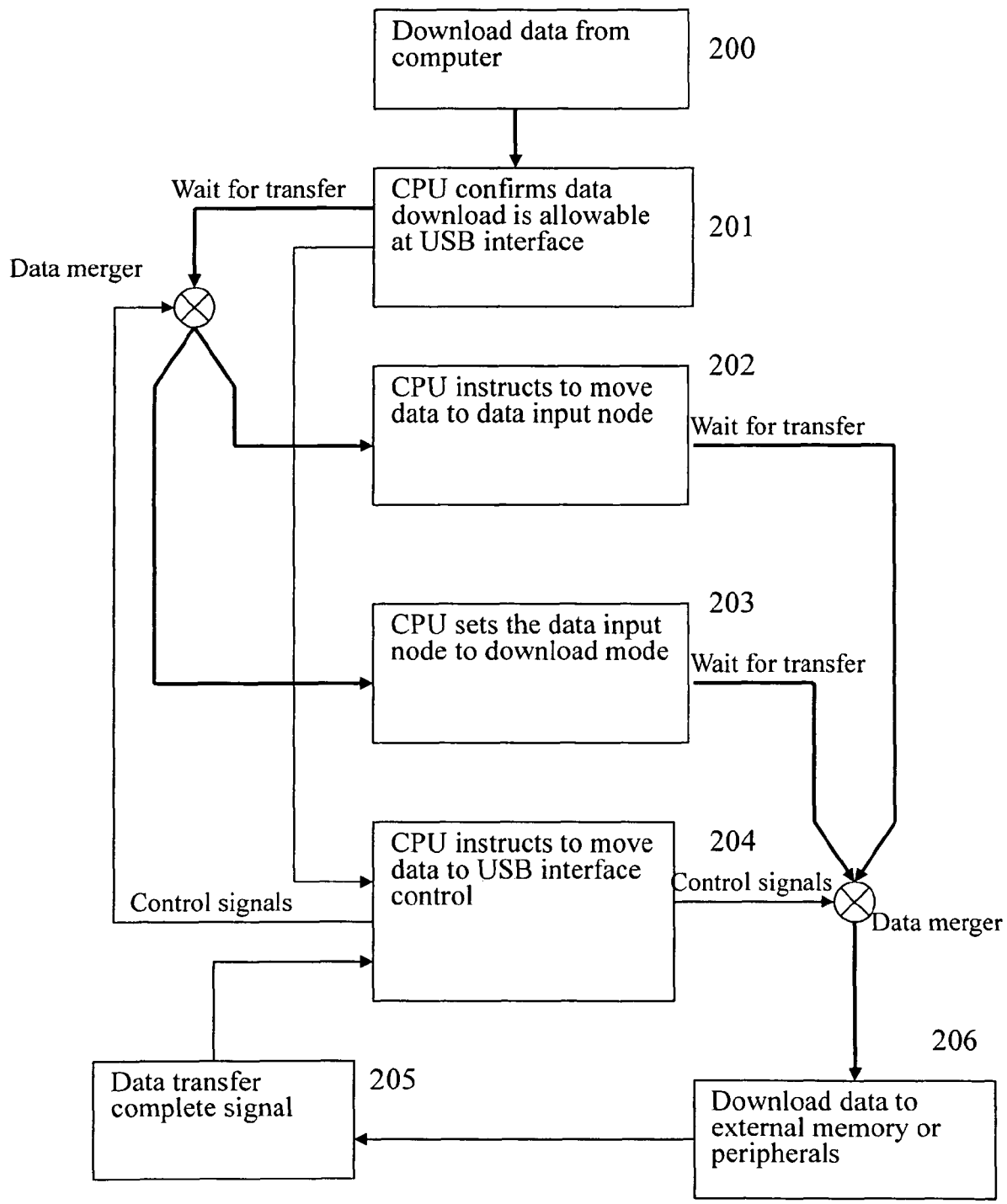
FIG. 3 is the flow chart of its upload mode.

FIG. 3 is the flow chart of the data upload mode of the USB interface data transmission device of the present invention. As shown in this figure, when downloading data from the computer, at 200 the external memory 70 or the peripheral device 60 requests to download bulk data from the computer 50, whereby the computer generates instructions to download data. At 201 the central controller unit 20 confirms via the USB interface controller device 10 that the USB communication interface is ready for data download. At 202 the USB interface controller unit 10 starts to receive the first batch of data and store the batch to the data input node 81. The default settings of the data input node 81 define the data input node 81 as a data transfer device to support the data input. At 203 the central controller unit 20 activates the data output node 82 and configures its data transfer mode into the data input mode, whereby the data output node 82 starts to receive data. At 204 the dynamic data input node 81 generates a "data receive complete" signal to the central controller unit 20, after all the data have been received. At 206 the central controller unit 20 starts to move the first batch of data to the external memory 70 or the peripheral device 60. After the first batch of data has been transferred, at 206 the central controller unit 20 moves the second batch data from the data output node 82 to the external memory 70 or the peripheral device 60. During the time when the central controller unit 20 is waiting for the complete transfer of second batch of data, the central controller unit 20 moves the third batch of data received by the USB interface controller unit 10 to the data input node 81 (step 202). When the second batch of data is transferred, the USB interface controller unit 10 generates a "data transfer complete" signal, whereby the central controller unit 20 starts to transfer the third batch data from the data input node 81 to the external memory 70 or the peripheral device 60 (step 206).

As described above, the USB interface data transfer device is able to dynamically change the data transfer mode between the upload mode and the download mode, whereby the data transfer speed through the USB interface is enhanced, while the costs of the device is not substantially increased.

As the present invention has been shown and described with reference to preferred embodiments thereof, those skilled in the art will recognize that the above and other changes may be made therein without departing form the spirit and scope of the invention.

What is claimed is:

1. A USB interface data transmission device to exchange data between a computer and a peripheral device, comprising:
   a USB interface controller unit to communicate with said computer;
   a dynamic data transmission unit comprising a data input node and a data output node wherein in a normal mode said data input node supports a data downloading operation and said data output node support a data uploading operation, in a data download mode both said data input node and said data output node support said data downloading operation and in a data upload mode both said data input node and said data output node support said data uploading operation;
   a central controller unit to select one of said normal mode, said data download mode and said data upload mode and to control peripheral interfacing functions of said USB interface controller unit;
   a transmission mode configuration unit to obtain information representing said mode selected by said central controller unit and to announce said selected mode of said dynamic data transmission unit to said computer accordingly;
   a driver program memory to store application programs to be used by said central controller unit; and
   a data transmission interface to transfer data from said dynamic data transmission unit or said central controller unit to said peripheral device or from said peripheral device to said dynamic data transmission unit or said central controller unit.

2. The USB interface data transmission device according to claim 1, wherein said data output node is one selected from the group consisted of a bulk transfer node, an interrupt transfer node and a isochronous transfer node.

3. The USB interface data transmission device according to claim 1, wherein said data input node is one selected from the group consisted of a bulk transfer node, an interrupt transfer node and a isochronous transfer node.

4. The USB interface data transmission device according to claim 1, wherein said central controller unit is one selected from the group consisted of a microcontroller and a microprocessor.

5. The USB interface data transmission device according to claim 1, wherein said data transmission interface comprises a bidirectional data transmission interface.

6. The USB interface data transmission device according to claim 5, wherein said bidirectional data transmission interface is one selected from the group consisted of an SPI interface, a Smart Card Reader interface, a UART interface, a GPIO interface or their combinations.

7. The USB interface data transmission device according to claim 1, wherein said driver program memory is one selected from the group consisted of an OTP ROM, a mask ROM or an external NOR flash memory.

8. A USB interface data transmission system, comprising:
   a computer;
   a peripheral device to exchange data with said computer; and
   a USB interface data transmission device to dynamically control mode of data exchange between said computer and said peripheral device, wherein said USB interface data transmission device comprises:
   a USB interface controller unit to communicate with said computer;
   a dynamic data transmission unit comprising a data input node and a data output node wherein in a normal mode said data input node supports a data downloading operation and said data output node support a data uploading operation, in a data download mode both said data input node and said data output node support said data downloading operation and in a data upload mode both said data input node and said data output node support said data uploading operation;
   a central controller unit to select one of said normal mode, said data download mode and said data upload mode and to control peripheral interfacing functions of said USB interface controller unit;
   a transmission mode configuration unit to obtain information representing said mode selected by said central controller unit and to announce said selected mode of said dynamic data transmission unit to said computer accordingly;
   a driver program memory to store application programs to be used by said central controller unit; and
   a data transmission interface to transfer data from said dynamic data transmission unit or said central controller unit to said peripheral device or from said peripheral device to said dynamic data transmission unit or said central controller unit.

9. The USB interface data transmission system according to claim 8, further comprising an external memory to exchange data with said computer.

10. The USB interface data transmission system according to claim 8, wherein said data output node is one selected from the group consisted of a bulk transfer node, an interrupt transfer node and a isochronous transfer node.

11. The USB interface data transmission system according to claim 8, wherein said data input node is one selected from the group consisted of a bulk transfer node, an interrupt transfer node and a isochronous transfer node.

12. The USB interface data transmission system according to claim 8, wherein said central controller unit is one selected from the group consisted of a microcontroller and a microprocessor.

13. The USB interface data transmission system according to claim 8, wherein said data transmission interface comprises a bidirectional data transmission interface.

14. The USB interface data transmission system according to claim 13, wherein said bidirectional data transmission interface is one selected from the group consisted of an SPI interface, a Smart Card Reader interface, a UART interface, a GPIO interface or their combinations 15. The USB interface data transmission system according to claim 8, wherein said driver program memory is one selected from the group consisted of an OTP ROM, a mask ROM or an external NOR flash memory.

16. The USB interface data transmission system according to claim 8, wherein said peripheral device comprises a plug-and-play portable device.

* * * * *